(12) United States Patent
Ghobrial et al.

(10) Patent No.: US 7,483,481 B1
(45) Date of Patent: Jan. 27, 2009

(54) SYSTEM AND METHOD FOR ADAPTIVELY UPDATING PRECODER TAPS

(75) Inventors: Ayman Ghobrial, Huntsville, AL (US); Fred Chu, Madison, AL (US); Michael D. Turner, Huntsville, AL (US); Kevin W. Schneider, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 699 days.

(21) Appl. No.: 10/930,343

(22) Filed: Aug. 31, 2004

(51) Int. Cl.
 *H03H 7/30* (2006.01)
(52) U.S. Cl. .................. 375/233; 375/232; 375/350; 375/222; 348/607
(58) Field of Classification Search .............. 375/232, 375/233, 296
 See application file for complete search history.

(56) References Cited

U.S. PATENT DOCUMENTS

| | | | |
|---|---|---|---|
| 5,249,200 A | | 9/1993 | Chen et al. |
| 5,453,797 A | * | 9/1995 | Nicolas et al. ............ 348/607 |
| 5,513,216 A | | 4/1996 | Gadot et al. |
| 5,557,646 A | * | 9/1996 | Honma .................... 375/346 |
| 5,881,363 A | | 3/1999 | Ghosh et al. |
| 6,185,301 B1 | * | 2/2001 | Muraoka ............... 379/406.08 |
| 6,314,135 B1 | | 11/2001 | Schneider et al. |
| 6,400,761 B1 | | 6/2002 | Smee et al. |
| 6,829,298 B1 | * | 12/2004 | Abe et al. ................. 375/233 |
| 6,928,107 B1 | * | 8/2005 | Olafsson et al. ........... 375/219 |
| 2002/0044598 A1 | * | 4/2002 | Frenkel et al. ............. 375/232 |
| 2002/0094043 A1 | * | 7/2002 | Chu et al. ................. 375/346 |
| 2003/0035495 A1 | * | 2/2003 | Laamanen et al. ......... 375/296 |
| 2004/0213342 A1 | * | 10/2004 | Ghosh ..................... 375/233 |
| 2004/0252755 A1 | * | 12/2004 | Jaffe et al. ................ 375/233 |
| 2005/0254570 A1 | * | 11/2005 | Amizic et al. ............. 375/233 |
| 2006/0146925 A1 | * | 7/2006 | Birru ....................... 375/233 |
| 2007/0104264 A1 | * | 5/2007 | Park et al. ................. 375/233 |

OTHER PUBLICATIONS

Hiroshi Harashima and Hiroshi Miyakawa, "Matched-Transmission Technique for Channels With Intersymbol Interference," IEEE Transactions on Communications, vol. Com-20, No. 4, Aug. 1972.

(Continued)

*Primary Examiner*—David C. Payne
*Assistant Examiner*—Leon-Viet Q Nguyen
(74) *Attorney, Agent, or Firm*—Thomas, Kayden, Horstemeyer & Risley, L.L.P.

(57) ABSTRACT

A system for adaptively updating precoder taps comprises a first signal path, a second signal path, a delay mechanism, and logic. The first signal path is configured to receive encoded signals. The first signal path has a decoder that is configured to decode the encoded signals thereby recovering data originally transmitted from a remote transmitter. The delay mechanism is configured to receive and delay the encoded signals. The second signal path is connected in parallel with the first signal path and is configured to receive the encoded signals delayed by the delay mechanism. The second signal path has an adaptive filter configured to filter the encoded signals received by the second signal path based on a set of coefficients of the adaptive filter. The adaptive filter is configured to adaptively update the coefficients based on the data recovered by the first signal path. The logic is configured to adaptively generate new precoder taps based on the coefficients and to transmit the new precoder taps to a precoder.

46 Claims, 9 Drawing Sheets

OTHER PUBLICATIONS

John E. Smee and Stuart C. Schwartz, "Adaptive Compensation Techniques for Communications Systems with Tomilson-Harashima Precoding," IEEE Transactions on Communications, vol. 51, No. 6, Jun. 2003.

Eli Shusterman, "Performance Implications of a Non-Adaptive Tomlinson-Harashima Precoder," Orckit Communications Ltd., T1E1.4/98-060, Mar. 1998.

Shawn McCaslin, "HDSL2 Performance with Run-Time Precoder Coefficient Updates," T1E1.4 Technical Subcommittee Working-Group Members, T1E1.4/98-217R1, Jun. 1998.

U.S. Appl. No. 09/761,910, entitled "Apparatus, Method and System for Correlated Noise Reduction In A Trellis Coded Environment," filed Jan. 17, 2001.

* cited by examiner

SYSTEM AND METHOD FOR ADAPTIVELY UPDATING PRECODER TAPS

RELATED ART

The performance of a data communication system can be significantly improved by implementing one or more equalizers in a receiver of the data communication system. An equalizer is usually able to eliminate most of the linear distortion caused by the transmission channel that couples the receiver to a remote transmitter. Further, the equalizer attempts to whiten noise that is coupled to the channel from a variety of sources.

It is generally well known that a decision feedback equalizer (DFE) typically has performance that exceeds that of a linear equalizer (LEQ) having no feedback. However, a decision feedback equalizer is generally not suitable for use in a receiver with a decoder that introduces a significant amount of delay to the feedback of the decision feedback equalizer. In this regard, most of the intersymbol interference (ISI) energy usually occurs within the first few symbol intervals after a pulse has been received, and a delay in the feedback path limits the ability of the decision feedback equalizer to cancel ISI up to the amount of the delay.

Various error correcting coding techniques, such as Trellis coding, for example, have been developed to improve the performance of data communication systems. According to such coding techniques, signals are typically encoded with at least one redundant bit of information at a transmitter. Once the encoded signals have been transmitted through a transmission channel to a receiver, the receiver decodes the signals to recover the data originally transmitted by the transmitter. The redundant bit or bits encoded by the transmitter enable the receiver to correct for errors caused by distortion from the transmission channel. Unfortunately, the decoding process at the receiver introduces a significant amount of delay such that the receiver is usually unable to effectively employ a decision feedback equalizer.

Precoders, like decision feedback equalizers, are typically employed to reduce the effects of transmission channel distortion. Further, precoders are generally compatible with error correcting coding techniques making precoders an attractive solution for compensating distortion in communication systems that employ error correcting coding.

A precoder is implemented at a transmitter and introduces distortion to the signals to be transmitted through a transmission medium in such a manner that the precoder distortion tends to cancel the distortion introduced by the channel. Thus, the signals transmitted through the channel arrive at the receiver with substantially less overall distortion as compared to signals transmitted by systems that do not employ precoders.

To successfully reduce the distortion of signals communicated through a transmission channel, a precoder must be initialized depending on the characteristics of the channel. In this regard, signals are transmitted through the transmission channel during a training mode that precedes a data mode of operation. An adaptive filter, such as a decision feedback equalizer, at the receiver is used to reduce the distortion of the training signals. Upon completion of the training mode, the filter coefficients generated by the filter are used to initialize the coefficients of the precoder, referred to as "taps." The filter coefficients and, therefore, the precoder taps have been trained to reflect the characteristics of the channel during training. After transitioning to the data mode, the precoder then begins to inject distortion, based on the precoder taps, into the signals to be communicated through the transmission channel.

Since the precoder taps have been effectively trained to the characteristics of the channel during training, the distortion introduced by the precoder should successfully cancel the distortion introduced by the channel such that the overall distortion of the signals received by the receiver is substantially reduced. However, if the characteristics of the channel significantly change after training, the precoder taps may become relatively obsolete such that the performance of the precoder is significantly reduced. In such a situation, re-training may be necessary in order to achieve a desired signal quality level.

In an effort to reduce the occurrences of re-trains, attempts have been made to develop techniques that enable precoder taps to be adaptively updated during the data mode to accommodate for changes to the characteristics of the transmission channel. Unfortunately, such techniques are often plagued with performance and/or reliability issues. Moreover, better techniques for adaptively updating precoder taps to improve the performance of a precoder in view of changes in transmission channel characteristics are generally desired.

SUMMARY OF THE DISCLOSURE

Generally, embodiments of the present disclosure provide systems and methods for adaptively updating precoder taps to accommodate for changes in transmission channel characteristics.

A system in accordance with one exemplary embodiment of the present disclosure comprises a first signal path, a second signal path, a delay mechanism, and logic. The first signal path is configured to receive encoded signals. The first signal path has a decoder that is configured to decode the encoded signals thereby recovering data originally transmitted from a remote transmitter. The delay mechanism is configured to receive and delay the encoded signals. The second signal path is connected in parallel with the first signal path and is configured to receive the encoded signals delayed by the delay mechanism. The second signal path has an adaptive filter configured to filter the encoded signals received by the second signal path based on a set of coefficients of the adaptive filter. The adaptive filter is configured to adaptively update the coefficients based on the data recovered by the first signal path. The logic is configured to adaptively generate new precoder taps based on the coefficients and to transmit the new precoder taps to a precoder.

A system in accordance with another exemplary embodiment of the present disclosure comprises a first signal path, a second signal path, and logic. The first signal path is configured to receive an encoded signal and has a decoder configured to decode the encoded signal thereby recovering a data symbol originally transmitted from a remote transmitter. The second signal path is configured to receive the encoded signal and has an adaptive filter configured to filter the encoded signal based on a set of coefficients of the adaptive filter after the decoder has decoded the encoded signal. The adaptive filter is further configured to adaptively update the coefficients based on the data symbol recovered by the decoder. The logic is configured to adaptively generate new precoder taps based on the coefficients and to transmit the new precoder taps to a precoder.

A method in accordance with an exemplary embodiment of the present disclosure comprises the steps of: providing a receiver having a first signal path and a second signal path that is in parallel with the first signal path, the first signal path having a decoder and the second signal path having an adaptive filter; receiving an encoded signal at the receiver; decoding the encoded signal via the decoder thereby recovering data originally transmitted from a remote transmitter; filtering, after the decoding step, the encoded signal via the adaptive filter; adaptively updating coefficients of the adaptive filter based on the data recovered by the decoding step; generating new precoder taps based on the coefficients; and transmitting the new precoder taps to a precoder.

A method in accordance with another exemplary embodiment of the present disclosure comprises the steps of: providing a receiver having a first signal path and a second signal path that is in parallel with the first signal path, the first signal path having a decoder and the second signal path having an adaptive filter; receiving an encoded signal at the receiver; transmitting the encoded signal to the first signal path and to the second signal path; decoding, via the decoder, the encoded signal transmitted to the first signal path thereby recovering data originally transmitted from a remote transmitter; delaying the encoded signal transmitted to the second signal path; filtering, via the adaptive filter, the delayed signal based on the data recovered by the decoder; adaptively generating new precoder taps based on coefficients of the adaptive filter; and transmitting the new precoder taps to a precoder.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Embodiments of the present disclosure generally pertain to systems and methods for adaptively updating precoder taps to accommodate for changes in transmission channel characteristics. A system in accordance with one embodiment of the present disclosure utilizes a receiver that has at least two signal paths. In a first signal path, encoded signals communicated through a transmission channel are decoded in order to recover data originally transmitted by a remote transmitter. In a second signal path, the encoded signals are operated on by an adaptive filter, which uses the data produced by the first signal path as feedback to adaptively adjust its coefficients. The adjusted filter coefficients are then used to provide a new set of precoder taps for a precoder at the remote transmitter. By updating the precoder with the new set of precoder taps, the precoder is able to adaptively accommodate changes in the transmission channel.

Figure 1:
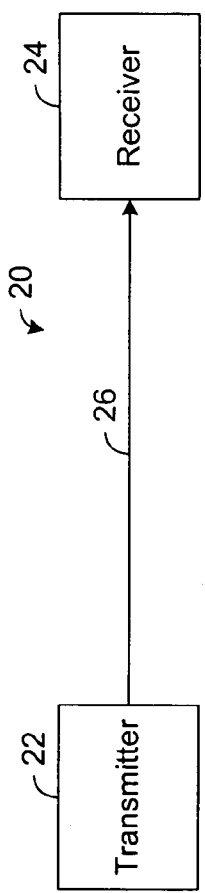
FIG. 1 is a block diagram illustrating an exemplary communication system in accordance with one embodiment of the present disclosure.

FIG. 1 depicts an exemplary data communication system 20 having a transmitter 22 that is coupled to a receiver 24 by a transmission medium 26, such as a subscriber line, which provides at least one transmission channel between the transmitter 22 and the receiver 24. The transmitter 22 modulates signals with data to be communicated to the receiver 24 and transmits the modulated signals through a transmission channel of the subscriber line 26. The receiver 24 receives and demodulates these signals to recover the data transmitted by the transmitter 22.

Figure 2:
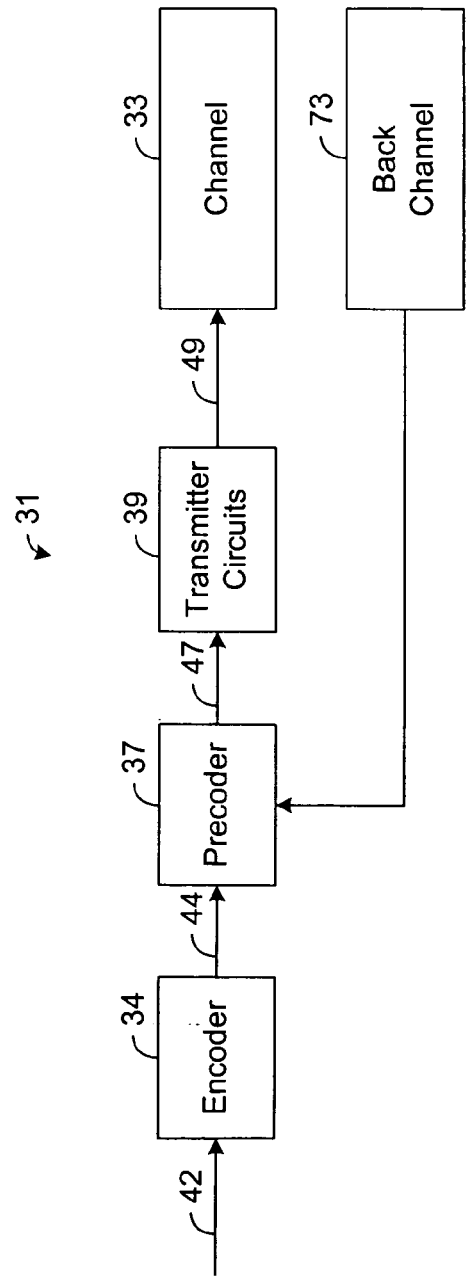
FIG. 2 is a block diagram illustrating a conventional transmitter.

FIG. 2 depicts a conventional transmitter 31 that may be used to transmit data to a remote receiver via a transmission channel 33. The transmitter 31 comprises an encoder 34, a precoder 37, such as a Tomlinson-Harashima precoder, and transmitter circuits 39. The encoder 34 receives a signal 42 and modulates the signal 42 with data to be transmitted to a remote receiver. The encoder 34 also uses error correcting encoding techniques to encode the signal with redundant information so that transmission errors may be detected and corrected by the remote receiver. As an example, the encoder 34 may perform Trellis coded modulation to provide a modulated signal 44.

The precoder 37 has a set of coefficients, referred to as "taps," that are initialized during training based on the characteristics of the channel 33 used by the transmitter 31 to transmit data to the remote receiver. The precoder taps are initialized such that the precoder 37 introduces, to the signal 44, distortion that tends to cancel the distortion introduced by the transmission channel 33. Thus, as will be described in more detail hereinbelow, the signal 47 output from the precoder 37 is predistorted in such manner to substantially negate the distortion introduced by the channel 33. However, if the distortion introduced by the channel 33 significantly changes after training, then a re-training may be required to re-initialize the precoder taps in order to keep the receive signal quality of the signals transmitted through the channel 33 within a desired or specified range.

As shown by FIG. 2, the predistorted signal 47 is input to transmitter circuits 39, which filter and shape the signal 47 to provide a signal 49 that is to be transmitted through the transmission channel 33. If the taps of precoder 37 are appropriately set, then the distortion introduced by the transmission channel 33 is substantially cancelled by the distortion introduced by the precoder 37 such that the signal 49, when received by the remote receiver, is not significantly distorted by the channel 33.

Figure 3:
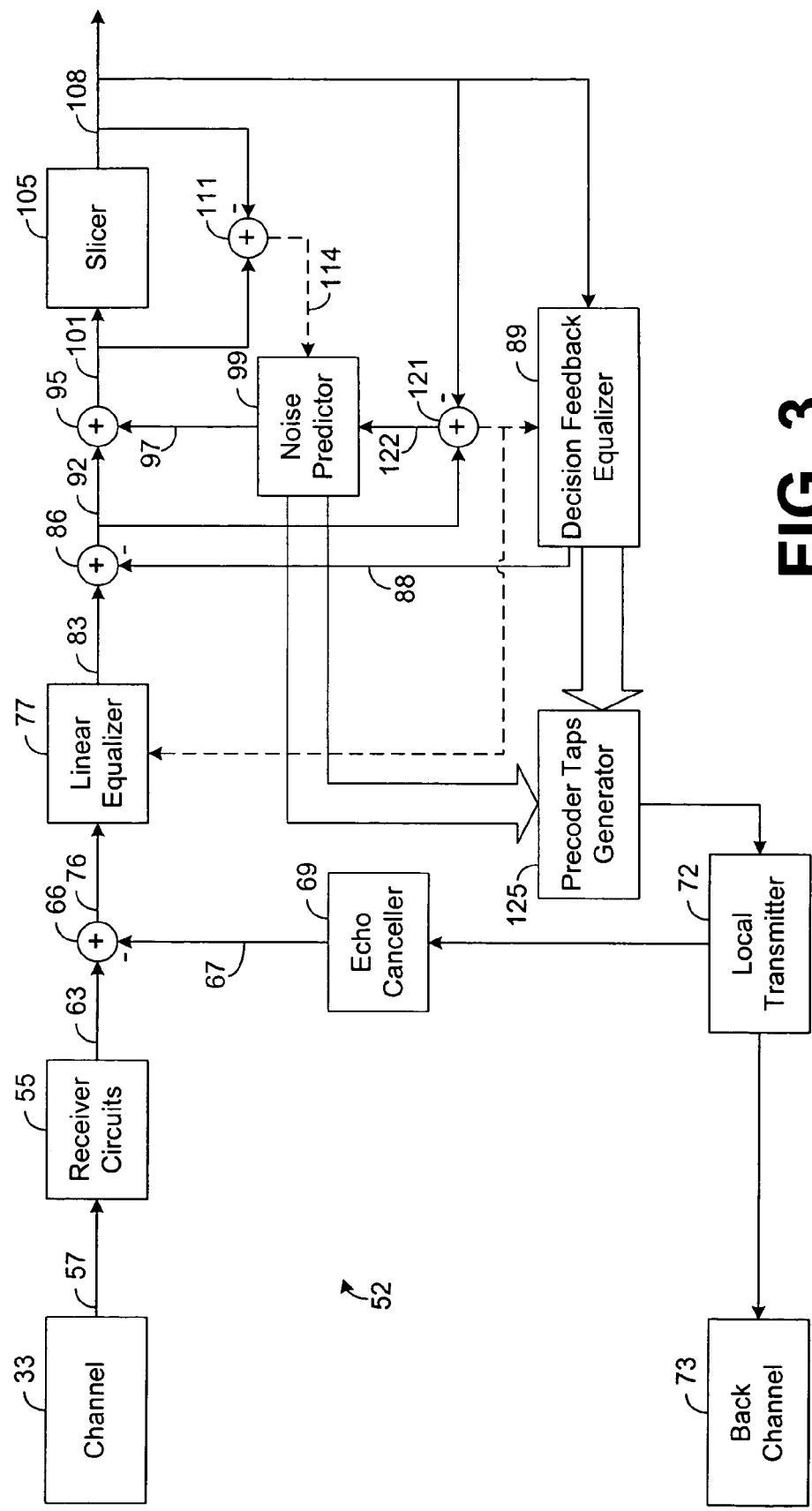
FIG. 3 is a block diagram illustrating a conventional receiver configured to operate in a training mode of operation.

FIG. 3 depicts a configuration of a conventional receiver 52 that may be used to receive signals transmitted by the transmitter 31 of FIG. 2 during training. As shown by FIG. 3, the receiver 52 comprises receiver circuits 55 that receive a signal 57 from the transmission channel 33. The receiver circuits 55 shape and filter the signal 57 to output a filtered signal 63 to a summer 66. The summer 66 combines the filtered signal 63 with an echo cancellation signal 67 from an echo canceller 69 in order to cancel echoes caused by a local transmitter 72 transmitting across the same transmission medium as the signals 57. In particular, the summer 66 subtracts the echo cancellation signal 67 from the filtered signal 63 to provide a signal 76, which is input to a linear equalizer 77. The linear equalizer 77 is an adaptive filter that filters the signal 76 based on a set of equalizer coefficients in order to reduce distortion in the signal 83 as compared to signal 76. The coefficients of the linear equalizer 77 are adaptively set during training based on the data recovered by the receiver 52.

A summer 86 combines the signal 83 with a signal 88 output by a decision feedback equalizer 89 to provide a combined signal 92. The decision feedback equalizer 89 has a set of coefficients that are used to define or weight the signal 88 such that the distortion of signal 92 is reduced as compared to signal 83. The coefficients of the decision feedback equalizer 89 are adaptively set during training based on the data recovered by the receiver 52.

A summer 95 combines the signal 92 with a signal 97 output by an adaptive noise predictor 99 to provide a combined signal 101. The noise predictor 99 has a set of coefficients that are used to define or weight the signal 97 such that the distortion of signal 101 is reduced as compared to signal 92. The coefficients of the noise predictor 99 are adaptively adjusted during training based on the slicer error of a slicer 105.

In this regard, the slicer 105 maps the signal 101 to a symbol value in effort to recover the data symbols originally transmitted from transmitter 31. A data signal 108 output by the slicer 105 defines these recovered symbols.

A summer 111 subtracts the slicer's input signal 101 from its output signal 108 to provide an error signal 114 representing the slicer error detected by the slicer 105. The noise predictor 99 adaptively adjusts its coefficients during training in an effort to minimize the slicer error indicated by signal 114.

A summer 121 subtracts the data signal 108 output by the slicer 105 from signal 92 to produce signal 122. The noise predictor 99 filters the signal 122 based on its coefficients and outputs the filtered signal 97 to summer 95. Further, the decision feedback equalizer 89 filters the data signal 108 based on its coefficients and outputs the filtered signal 88 to summer 86. Note that the linear equalizer 77 adaptively sets its coefficients during training based on the output of summer 121 in an effort minimize the distortion of signal 83, and the decision feedback equalizer 89 adaptively sets its coefficients during training based on the output of summer 121 in an effort to remove the distortion from signal 83. At the end of training, a precoder taps generator 125, based on the coefficients of the noise predictor 99 and decision feedback filter 89, generates a set of precoder taps to be used by the precoder 37 of the transmitter depicted by FIG. 2. The local transmitter 72 transmits this set of precoder taps to the transmitter 39, which loads the taps into precoder 37. Note that the local transmitter 72 may use a back channel 73 of the same transmission medium that provides channel 33. Alternatively, a separate transmission medium may be used to provide the back channel 73. Note that commonly assigned U.S. patent application entitled "Apparatus, Method and System for Correlated Noise Reduction in a Trellis Coded Environment," assigned Ser. No. 09/761,910, and filed on Jan. 17, 2001, which is incorporated herein by reference, describes techniques that may be employed to define precoder taps based on coefficients from a noise predictor and a decision feedback equalizer.

The following steps may be used to establish the coefficients of precoder 37, linear equalizer 77, noise predictor 99, and decision feedback equalizer 89 at the end of training.

Step 1: Convolve the coefficients of the decision feedback equalizer 89 with the coefficients of the noise predictor 99.

Step 2: Add the result of Step 1 to the coefficients of the decision feedback equalizer 89.

Step 3: Add the result of Step 2 to the coefficients of the noise predictor 99 to generate the coefficients of precoder 37.

Step 4: Replace the coefficients of the equalizer 77 by the result of the convolution between the coefficients of the equalizer 77 and the coefficients of the noise predictor 99.

Step 5: Set the coefficients of the noise predictor 99 and the coefficients of the decision feedback equalizer 89 to zero.

During the data mode, the precoder 37 uses its taps to appropriately distort the signal that is to be transmitted to the receiver 52. Further, in the data mode, the noise predictor 99 and decision feedback equalizer 89 of the receiver 52 are switched out so that they are not part of the receive signal path. Note that U.S. patent application Ser. No. 09/761,910 describes techniques that may be used to combine the coefficients of the noise predictor 99 with the coefficients in the linear equalizer 77 at the end of training so that the noise predictor 99 can be switched out or, in other words, removed from the receive signal path during the data mode. Moreover, during the data mode, the configuration of the receiver 52 appears as shown by FIG. 4.

Figure 4:
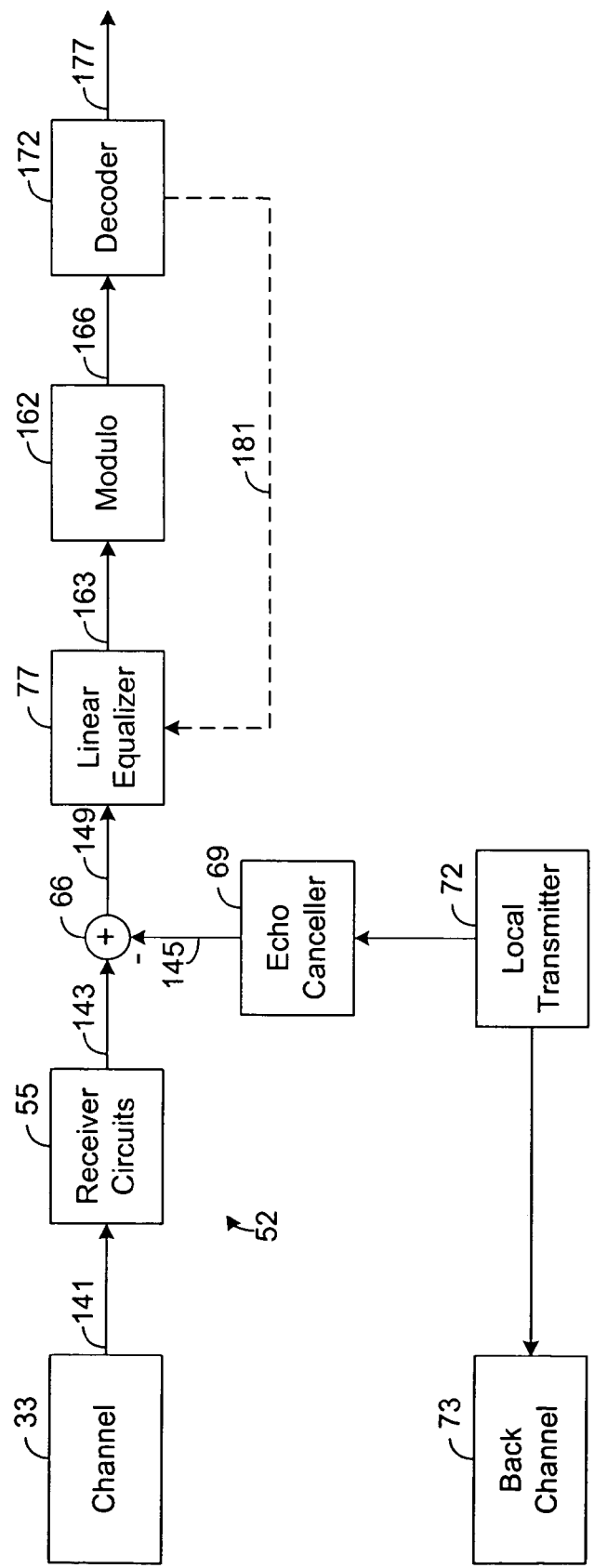
FIG. 4 is a block diagram illustrating a conventional receiver configured to operate in a data mode of operation.

Referring to FIG. 4, an encoded signal 141 transmitted through the channel 33 by the transmitter 31 is received by the receiver circuits 55, which shape and filter the signal 141 to provide a filtered signal 143. The filtered signal 143 is combined with an echo cancellation signal 145 by summer 66. The signal 149 output by the summer 66 is filtered by the linear equalizer 77 to reduce distortion. A modulo device 162 performs a modulo operation on the signal 163 to produce signal 166. The signal 166 is decoded by a decoder 172 to produce a decoded signal 177, which defines the data symbols originally transmitted by the transmitter 31. The decoder 172 also outputs a decoder error signal 181 indicative of the amount of error detected by the decoder 172 for the symbol that is being decoded. The error signal 181 is used by the linear equalizer 77 to adaptively adjust its coefficients.

Figure 5:
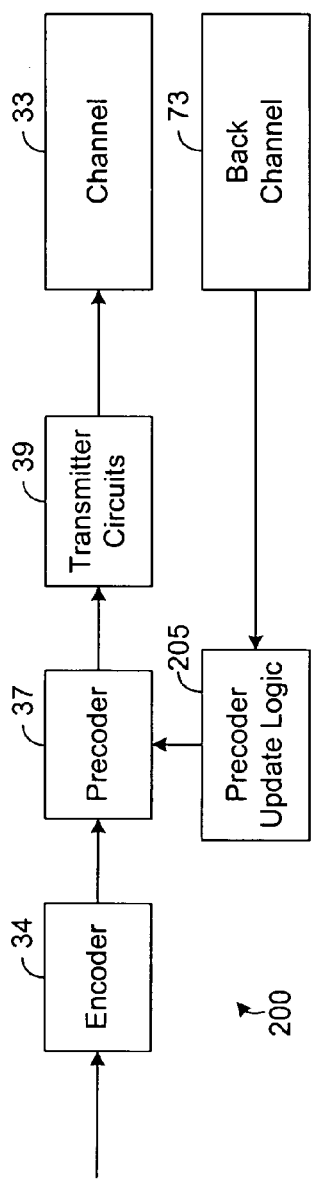
FIG. 5 is a block diagram illustrating a transmitter in accordance with one embodiment of the present disclosure.

FIG. 5 depicts a transmitter 200 that may be used to implement the transmitter 22 of FIG. 1 in accordance with one exemplary embodiment of the present disclosure. As can be seen by comparing FIGS. 2 and 5, the transmitter 200 may be similarly configured as compared to conventional transmitter 31. Note that the precoder 37 of FIG. 5 may be any known or future-developed precoder, such as the well-known Tomlinson-Harashima precoder, for example. Further, unlike the transmitter 31 of FIG. 2, the exemplary transmitter 200 of FIG. 5 comprises precoder update logic 205.

The precoder update logic 205 may be implemented in hardware, software, or a combination thereof. When at least a portion of the precoder update logic 205 is implemented in software, the transmitter 200 may comprise a processing element (not shown), such as a central processing unit or a digital signal processor, for executing the software of the precoder update logic 205. When at least a portion of the precoder update logic 205 is implemented in hardware, the logic 205 may comprise logic gates, transistors, and/or other types of circuit components for implementing the functionality of the precoder update logic 205, as will be described in more detail hereinbelow.

Figure 6:
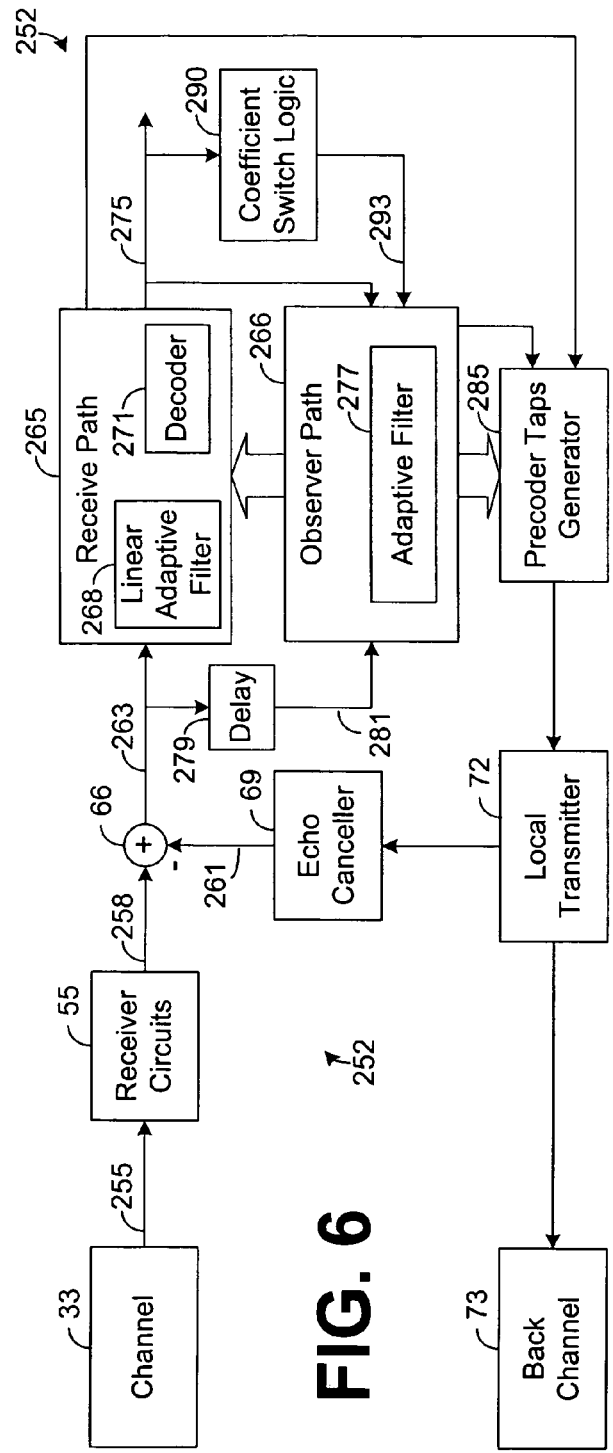
FIG. 6 is a block diagram illustrating a receiver configured to operate in a data mode of operation in accordance with one embodiment of present disclosure.

FIG. 6 depicts a receiver 252 in accordance with an exemplary embodiment of the present disclosure. The receiver 252 may be used to receive encoded signals transmitted from the transmitter 200 of FIG. 5. For illustrative purposes, assume that the transmitter 200 uses Trellis coded modulation to transmit data to the receiver 252, although other types of error correcting coding schemes may be employed in other embodiments.

As shown by FIG. 6, an encoded signal 255 transmitted from the transmitter 200 is received by receiver circuits 55, which filter and shape the encoded signal 255 to produce a filtered signal 258. Summer 66 combines the filtered signal 258 with an echo cancellation signal 261 from an echo canceller 69 in order to remove echoes induced by local transmitter 72. Thus, the summer 66 produces a combined signal 263 that is substantially free of echoes.

The combined signal 263 is then passed through two parallel signal paths, a receive path 265 and an observer path 266. The receive path 265 processes the combined signal 263 in order to recover the data symbols originally transmitted by the transmitter 200 (FIG. 5). Except for updating filter coefficients, as will be described in more detail hereinbelow, the observer path 266 generally does not interfere with or affect the operation of the receive path 265. As will be described in more detail hereinbelow, one purpose of the observer path 266 is to gather information based on the signals received from the channel 33 so that better filter and precoder coefficients can be determined to accommodate for changes in the channel 33.

Moreover, the receive path 265 comprises at least one linear adaptive filter 268, such as a linear equalizer or such as a linear equalizer and a noise predictor, for example, to filter the signals processed by the receive path 265. The receive path 265 also comprises a decoder 271 that decodes the signals processed by the receive path 265 using error correcting coding techniques, such as Trellis decoding, for example, depending on the type of encoding used by the transmitter 200 (FIG. 5). A decoded signal 275 output by the receive path 265 estimates the data symbols originally transmitted from the transmitter 200.

As shown by FIG. 6, a delay mechanism 279 preferably delays the signal 263 such that the observer path 266 receives a delayed signal 281 representing a time-delayed version of signal 263. Further, the observer path 266 comprises at least one adaptive filter 277. As will be described in more detail hereafter, the adaptive filter 277 in one embodiment comprises a linear equalizer and a noise predictor. In another embodiment, the adaptive filter 277 comprises a linear equalizer and a non-linear equalizer, such as a decision feedback equalizer, for example. In yet another embodiment, the adaptive filter 277 comprises a linear equalizer, a noise predictor, and a non-linear equalizer, such as a decision feedback equalizer, for example. In other embodiments, other types of components may be used to implement the adaptive filter 277.

The adaptive filter 277 filters the signal 281 received by the observer path 266 based on data signal 275 using known or future-developed filtering techniques. In this regard, the adaptive filter 277 uses signal 275 as feedback to adaptively adjust its coefficients in an effort to reduce or remove the distortion of the signal 281. The amount of delay introduced by delay mechanism 279 is preferably selected such that the adaptive filter 277 receives the time delayed version of signal 263 substantially close in time to receiving the feedback for this same signal from the receive path 265.

As an example, assume that a signal 263, referred to hereafter as the "sample signal," is output from the summer 66. This sample signal is processed by the receive path 265, which outputs a data signal 275 representing the decoded symbol of the sample signal. The amount of delay introduced by delay mechanism 279 is preferably such that the sample signal and the foregoing decoded symbol, which is based on the sample signal, is received by the adaptive filter 277 sufficiently close in time to enable the adaptive filter 277 to effectively adjust its coefficients to improve its performance.

Moreover, the amount of delay introduced by the delay mechanism 279 may be set to approximately equal the amount of delay introduced by the receive path 265, which is likely to be substantially equal to the delay of decoder 271. Thus, the adaptive filter 277 receives the sample signal from delay mechanism 279 at approximately the same time as receiving, from the receive path 265, the decoded symbol of this sample signal.

As shown by FIG. 6, the receiver 252 preferably comprises a precoder taps generator 285. In one exemplary embodiment, the precoder taps generator 285 monitors the decoder error detected by decoder 271 and the observer path error detected in the observer path. The observer path error generally refers to the amount of error detected for the data recovered by the observer path. In one embodiment, the precoder taps generator 285 calculates a decoder error value that represents an average of the decoder error over time and an observer path error value that represents an average of the observer path error over time. As an example, the decoder error value may be the mean square value of a specified number of most recent decoder error samples, and the observer path error value may be the mean square value of a specified number of most recent observer path error samples. In other embodiments, other types of decoder error values and observer path error values may be used.

Moreover, when the difference between the decoder error value and the observer path error value exceeds a specified threshold, the precoder taps generator 285 generates a new set of taps for the precoder 37 of FIG. 5. Note that, a significant difference (e.g., a difference that exceeds the threshold) between the decoder error value and the observer path error value indicates that the characteristics of the channel 33 have significantly changed since training such that the performance of the observer path 266, using adaptive filter 277, is significantly better than that of the receive path 265. In such a situation, the decoder error is likely to be significantly decreased by adaptively updating the precoder 37 of FIG. 5, as will be described in more detail below.

Figure 7:
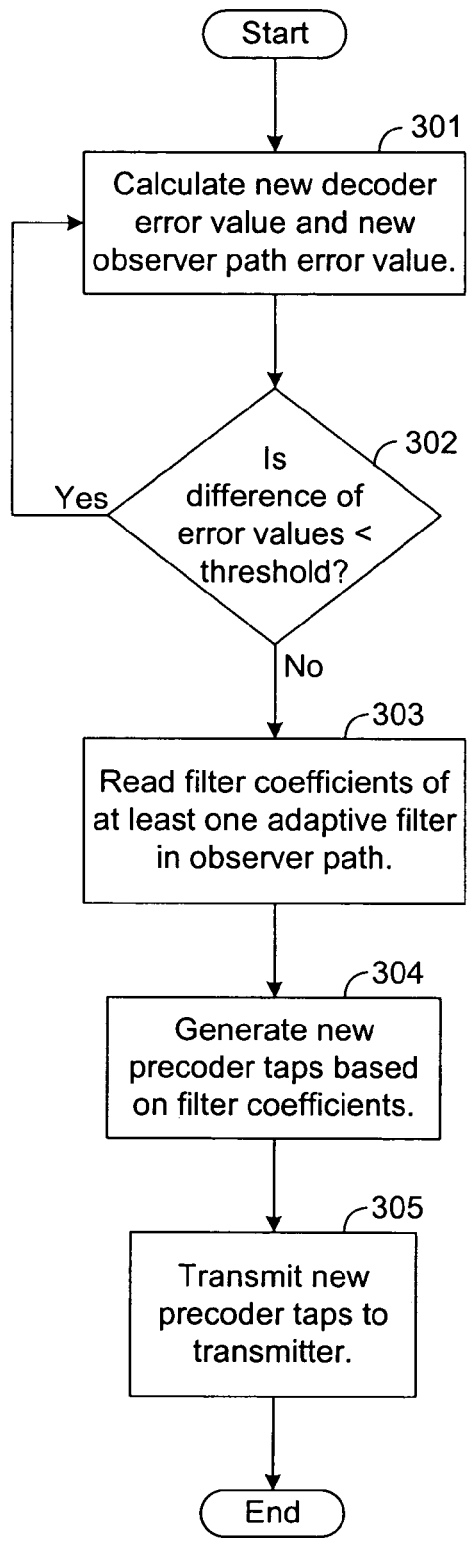
FIG. 7 is a flow chart illustrating an exemplary architecture and functionality of the receiver depicted by FIG. 6 in generating new precoder taps for the precoder depicted in FIG. 5.

In this regard, when the error difference exceeds the specified threshold, the precoder taps generator 285 reads the coefficients of the adaptive filter 277, and based on at least these coefficients, generates a new set of precoder taps, as shown by blocks 301-304 of FIG. 7. Since the adaptive filter 277 adaptively adjusts its coefficients based on feedback from receive path 265, the coefficients of the adaptive filter 277 and, therefore, the new set of precoder taps account for changes that have occurred in the channel 33 since training. Thus, the new set of precoder taps is likely to provide better results as compared to the current set of taps being used by the precoder 37.

After generating the new set of precoder taps, the precoder taps generator 285 provides such taps to the local transmitter 72, which transmits the taps to the transmitter 200 of FIG. 5 via back channel 73, as shown by block 305 of FIG. 7. The precoder update logic 205 then updates the precoder 37 with the new set of precoder taps received from the receiver 252 of FIG. 6. Thus, the precoder 37, by injecting distortion based on the new set of precoder taps, is able to better cancel the distortion introduced by the channel 33.

Note that an update of the precoder taps will likely affect the performance of the filter 268 (FIG. 6) in the receive path 265 of the receiver 252 if the coefficients of the filter 268 are not updated to account for the precoder taps update. Thus, when the taps of precoder 37 are updated, the coefficients of filter 268 are preferably updated based on at least the coefficients of adaptive filter 277 such that the filter 268 is better able to filter the signals precoded by the new set of precoder taps. In a preferred embodiment, the update of the filter 268 is synchronized with the update of the precoder 37 such that the filter 268 begins to use the updated filter coefficients when it begins to receive signals that have been precoded with the updated precoder taps.

Various techniques may be used to synchronize the update of the filter 268 with the update of the precoder 37. In one exemplary embodiment, the precoder update logic 205, before updating the precoder 37 with a new set of taps, transmits a message to the receiver 252. The message preferably indicates when the precoder update logic 205 will update the precoder 37 with the new set of taps.

Figure 8:
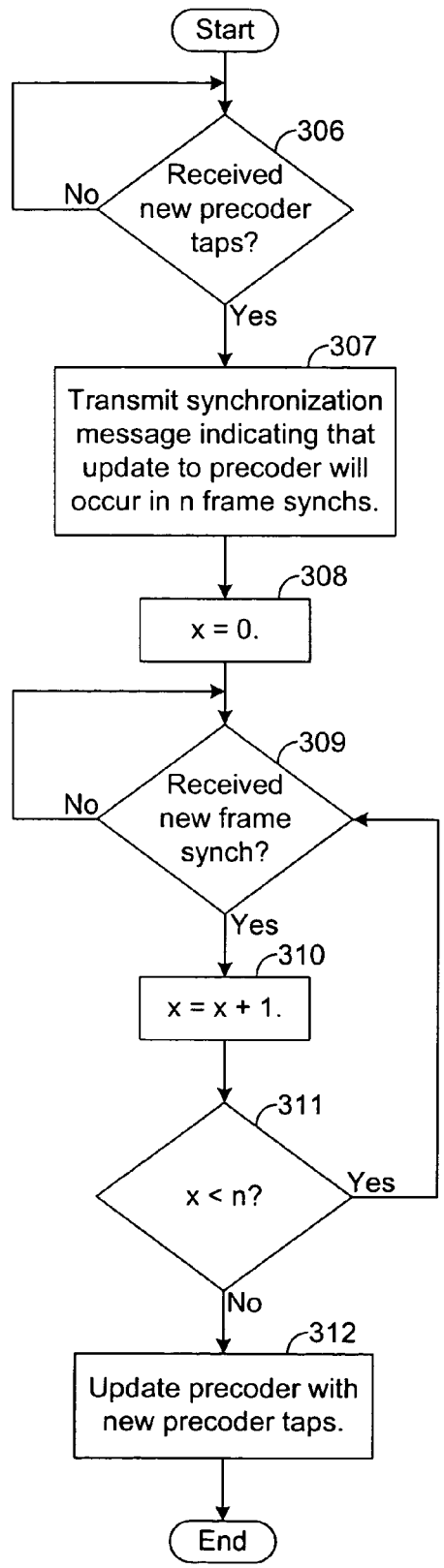
FIG. 8 is a flow chart illustrating an exemplary architecture and functionality of precoder update logic depicted in FIG. 5.

As an example, it is generally well known for transmitted signals to be segmented into different frames and for frame synchs to be positioned between the frames such that, for each frame, a frame synch identifies the end of the current frame and the beginning of the next frame. Moreover, as shown by blocks 306 and 307 of FIG. 8, when the precoder update logic 205 receives a new set of precoder taps for updating the precoder 37, the precoder update logic 205 may transmit a message indicating that the precoder's taps will be updated after an n number (e.g., three) of frame synchs, where n is any positive integer. For illustrative purposes, assume that the message indicates that the update to the precoder taps will occur after the next three frame synchs, although other numbers of frame synchs are possible in other embodiments. After transmitting such a message, the precoder update logic 205, in implementing blocks 308-312 of FIG. 8, may update the precoder taps upon the occurrence of the third frame synch that passes through the precoder 37 after the message. Thus, based on the message, the receiver 252 is able to determine when it begins to receive signals precoded with the new set of precoder taps. Note that the message may be communicated to the receiver 252 via an embedded control channel or according to other suitable techniques.

Figure 9:
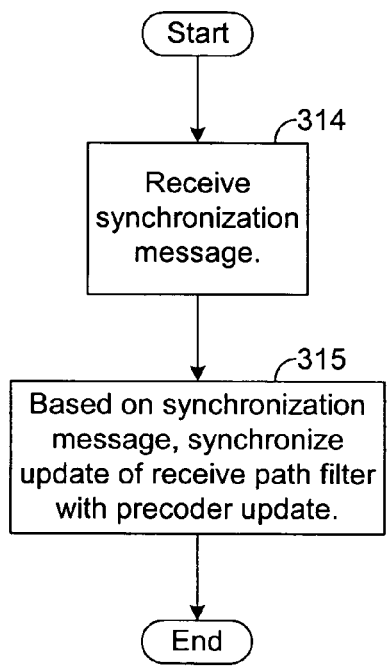
FIG. 9 is a flow chart illustrating an exemplary architecture and functionality of the receiver depicted by FIG. 6 in performing an adaptive update of a filter of a receive path.

Referring to FIGS. 6 and 9, coefficient switch logic 290, in block 314, receives the aforementioned message transmitted by the precoder update logic 205. Based on the message, the coefficient switch logic 290 controls when the coefficients of filter 268 are updated with the coefficients of adaptive filter 277. In this regard, the coefficient switch logic 290 transmits a switch notification signal 293 informing the adaptive filter 277 when the coefficients of filter 268 are to be updated. The logic 290 controls the timing of the signal 293, based on the message transmitted by precoder update logic 205, such that the coefficients of adaptive filter 277 are transmitted to and used to update the coefficients of filter 268 just prior to filter 268 receiving the first signal precoded with the new set of precoder taps. Thus, the filter 268 uses its current set of coefficients to filter up to the last signal precoded with the old set of precoder taps and uses a new set of coefficients, as updated by the coefficients from the adaptive filter 277, to filter the first signal precoded with the new set of precoder taps. In this manner, the update of the filter 268 can be synchronized, in block 315 of FIG. 9, with the update of the precoder 37 such that errors attributable to the precoder update are minimized.

It should be noted that the precoder taps generator 285 and coefficient switch logic 290 may be implemented in hardware, software, or a combination thereof. When at least a portion of the precoder taps generator 285 or the coefficient switch logic 290 is implemented in software, the receiver 252 may comprise a processing element (not shown), such as a central processing unit or a digital signal processor, for executing the software. When at least a portion of the logic of the precoder taps generator 285 or the coefficient switch logic 290 is implemented in hardware, such portion may comprise logic gates, transistors, and/or other types of circuit components.

In the embodiment described above, the decoder error detected by decoder 271 and observer path error detected in the observer path 266 are monitored to determine when an update to the precoder taps is to occur. It should be noted that, in other embodiments, other techniques may be employed for determining when an update to the precoder taps is desirable. Further, it is not necessary for the precoder taps to be generated in the receiver 252. For example, it is possible for the coefficients of the adaptive filter 277 to be transmitted to the transmitter 200 via the back channel 73 and for the precoder update logic 205 to generate the new precoder taps based on the transmitted filter coefficients.

Figure 10:
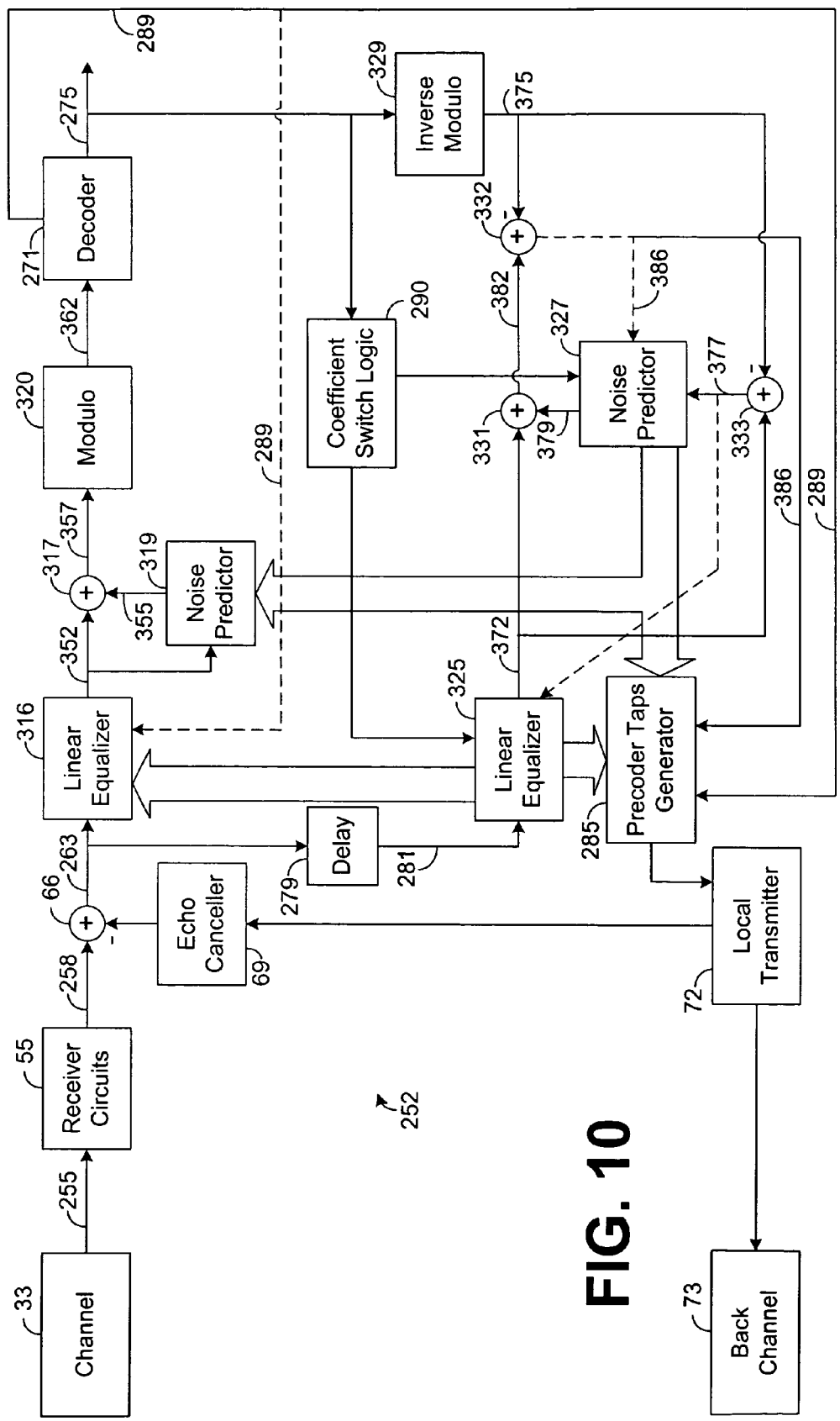
FIG. 10 is a block diagram illustrating a receiver configured to operate in a data mode of operation in accordance with another embodiment of present disclosure.

FIG. 10 depicts an exemplary configuration of the receive path 265 and observer path 266 in accordance with one embodiment of the present disclosure. In this regard, the receive path 265 is implemented via linear equalizer 316, a summer 317, a noise predictor 319, a modulo device 320, and decoder 271. Further, the observer path 266 is implemented via a linear equalizer 325, a noise predictor 327, an inverse modulo device 329, and summers 331-333.

Note that the coefficients of linear equalizer 316 and noise predictor 319 are preferably established during a training mode. These coefficients may be established in the same or similar manner that the conventional receiver 52 of FIG. 3 establishes the coefficients of linear equalizer 77 and noise predictor 99. Further, at the end of training, the coefficients of linear equalizer 316 and noise predictor 319 are combined using convolution and loaded into the linear equalizer 316. Then, the coefficients of the linear equalizer 316 are loaded into the linear equalizer 325, and the coefficients of both noise predictors 319 and 327 are loaded with zero values. Thus, at the start of the data mode, the linear equalizers 316 and 325 are similarly configured with the same coefficients, and the coefficients of the noise predictors 319 and 327 are initialized to zero.

During the data mode, the linear equalizer 316 filters the signal 263 received from summer 66 to produce a filtered signal 352, which is transmitted to noise predictor 319 and summer 317. The summer 317 combines the signal 352 with a signal 355 output by the noise predictor 319 to provide a combined signal 357. The noise predictor 319 has a set of coefficients that are used to define or weight the signal 355 such that the distortion of signal 357 is reduced as compared to signal 352.

The modulo device 320 performs a modulo operation on signal 357 to provide a modulo signal 362, which is decoded by decoder 271 using any suitable decoding techniques depending on the type of encoding employed by the transmitter 200 (FIG. 5). In one exemplary embodiment, Trellis encoding and decoding are respectively performed by the transmitter 200 and decoder 271 on the signals communicated from the transmitter 200 to the receiver 252. Moreover, the data signal 275 output by the decoder 271 defines decoded data symbols that represent the data originally transmitted by transmitter 200. The decoder 271 outputs a decoder error signal 289 indicative of the amount of error detected by the decoder 271 for the symbol that is being decoded. The linear equalizer 316 receives the decoder error signal 289 and adaptively updates its coefficients based on this signal 289.

In the observer path, the linear equalizer 325 filters the delayed signal 281 received from the delay mechanism 279 to produce a filtered signal 372, which is transmitted to summers 331 and 333. Further, the data signal 275 is operated on by an inverse modulo device 329, which removes the effects of modulo device 320 to provide signal 375. The summer 333 subtracts signal 375 from the filtered signal 372 to provide a combined signal 377, which is received by the noise predictor 327. The combined signal 377 is also received by the linear equalizer 325, which uses this signal 377 to adaptively update its coefficients.

The summer 331 combines the filtered signal 372 with a signal 379 output by the noise predictor 327 to provide a combined signal 382. The coefficients of the noise predictor 327 are used to define or weight the signal 379 such that the distortion of signal 382 is reduced as compared to signal 372.

The summer 332 subtracts the signal 375 from the combined signal 382 to provide a combined signal 386, which is transmitted to the noise predictor 327. The combined signal 386 is used by the noise predictor 327 to adaptively update its coefficients.

Over time, the characteristics of the channel 33 may change thereby adversely affecting the performance of the linear equalizer 316 and noise predictor 319. In this regard, the linear equalizer 316 receives feedback (i.e., signal 289) that can be used by the linear equalizer 316 in an attempt to adjust its coefficients to accommodate for the changes in the channel 33. However, since the coefficients of the precoder 37 are not adaptive, the linear equalizer 316 may be unable to effectively adjust its coefficients to adequately accommodate for the changes in the channel 33. The linear equalizer 325 and the noise predictor 327, on the other hand, are better able to adjust their coefficients to accommodate for the changes in the channel 33.

In particular, the delay introduced by the delay mechanism 279 enables the linear equalizer 325 and noise predictor 327 to receive feedback in a more timely manner relative to the signals input into these devices 325 and 327. In this regard, the delay mechanism 279 effectively cancels the effects of the delay introduced by the receive path and, in particular, the decoder 271 so that the linear equalizer 325 and the noise predictor 327 are better able to adjust their respective coefficients to accommodate the changes in the channel 33. Thus, the signal 382 of the observer path should be less distorted than the corresponding signal 357 of the receive path. Further, performance can be significantly improved by updating the taps of precoder 37 (FIG. 5) and the coefficients of linear equalizer 316 and noise predictor 319 based on the coefficients of the noise predictor 327, as described hereinbelow.

In this regard, the precoder taps generator 285 monitors the decoder error signal 289 and the signal 386, which indicates the observer path error. When the decoder error, as indicated by signal 289, mean squared value exceeds the error signal 386 mean squared value by a specified threshold, the precoder taps generator 285 determines that a precoder update is desirable. In such a situation, the precoder taps generator 285 reads the coefficients of the linear equalizer 325 and the noise predictor 327 and, based on these coefficients, generates a new set of taps for the precoder 37 (FIG. 5). U.S. patent application Ser. No. 09/761,910 describes exemplary techniques that may be used to generate such a new set of precoder taps. After generating the new precoder taps, the precoder taps generator 285 provides the new precoder taps to the local transmitter 72, which transmits these taps to the transmitter 200 (FIG. 5) via back channel 73.

As described above, the update precoder logic 205 of FIG. 5 updates the precoder 37 with the new precoder taps after transmitting to the receiver 252 a message that enables synchronization of the precoder update with an update of the linear equalizer 316 and noise predictor 319. In this regard, in response to the synchronization message transmitted by the precoder update logic 205, the coefficient switch logic 290 causes the coefficients of the linear equalizer 325 to be loaded into the linear equalizer 316 thereby replacing the current coefficients of the linear equalizer 316 with the coefficients from linear equalizer 325. The coefficient switch logic 290 also causes the coefficients of the noise predictor 327 to be loaded into the noise predictor 319 thereby replacing the current coefficients of the noise predictor 319 with the coefficients from noise predictor 327. Further, the coefficient switch logic 290 controls the timing of the updates of the linear equalizer 316 and the noise predictor 319, based on the synchronization message transmitted from the precoder update logic 205, such that the updates of the linear equalizer 316 and noise predictor 319 are synchronized with the update of the precoder 37. In particular, the coefficient switch logic 290 ensures that the linear equalizer 316 begins to use the new coefficients from the linear equalizer 325 when it begins to receive signals precoded with the new set of precoder taps, and the noise predictor 319 begins to use the new coefficients from the noise predictor 327 when it begins to receive signals precoded with the new set of precoder taps.

After the occurrences of the precoder update and the updates to the linear equalizer 316 and noise predictor 319, the error detected by decoder 271 should decrease. As the channel 33 changes, the decoder error may again begin to increase, and when the difference between the decoder error (as indicated by signal 289) and observer path error (as indicated by signal 386) again exceeds the specified threshold, the precoder 37, linear equalizer 316, and noise predictor 319 may again be updated as described above. Moreover, by repeatedly updating the precoder 37, the linear equalizer 316, and the noise predictor 319 based on the performance of the receiver 252, as described above, the receiver's performance can be significantly improved without the need of a re-train.

The following steps may be used to initialize and update the coefficients for the precoder 37, linear equalizers 316 and 325, and noise predictors 319 and 327 of FIG. 10.

A. Initialization

Step I1: Set the coefficients of the linear equalizer 325 equal to the coefficients of the linear equalizer 316.

Step I2: Set the coefficients of the noise predictor 319 and the coefficients of the noise predictor 327 to zero.

B. Operation

Step 1: Calculate the mean squared value of error signal 365.

Step 2: Calculate the mean squared value of error signal 386.

Step 3: Compare the results of steps Step 1 and Step 2. If the result of Step 1 is substantially larger than the result of Step 2 then go to Step 5.

Step 4: Go to Step 1.

Step 5: Calculate the update coefficients for the precoder 37 as follows:

Step 5.1: Convolve the coefficients of the precoder 37 with the coefficients of the noise predictor 327.

Step 5.2: Add the result of Step 5.1 to the coefficients of the precoder 37.

Step 5.3: Add the result of Step 5.2 to the coefficients of the noise predictor 327.

Step 6: Send the result of Step 5.3 to the transmitter 200.

Step 7: Wait until transmitter 200 receives the update precoder coefficients.

Step 8: Load the precoder 37 with the results of Step 5.3.

Step 10: Set the coefficients of the noise predictor 319 equal to the coefficients of the noise predictor 327.

Step 11: Set the coefficients of the linear equalizer 316 equal to the coefficients of the linear equalizer 325.

Step 12: Convolve the coefficients of the linear equalizer 325 with the coefficients of the noise predictor 327.

Step 13: Load the result of Step 12 into the coefficients of the linear equalizer 325.

Step 14: Set the coefficients of the noise predictor 327 to zero.

Step 15: Go to Step 1.

Figure 11:
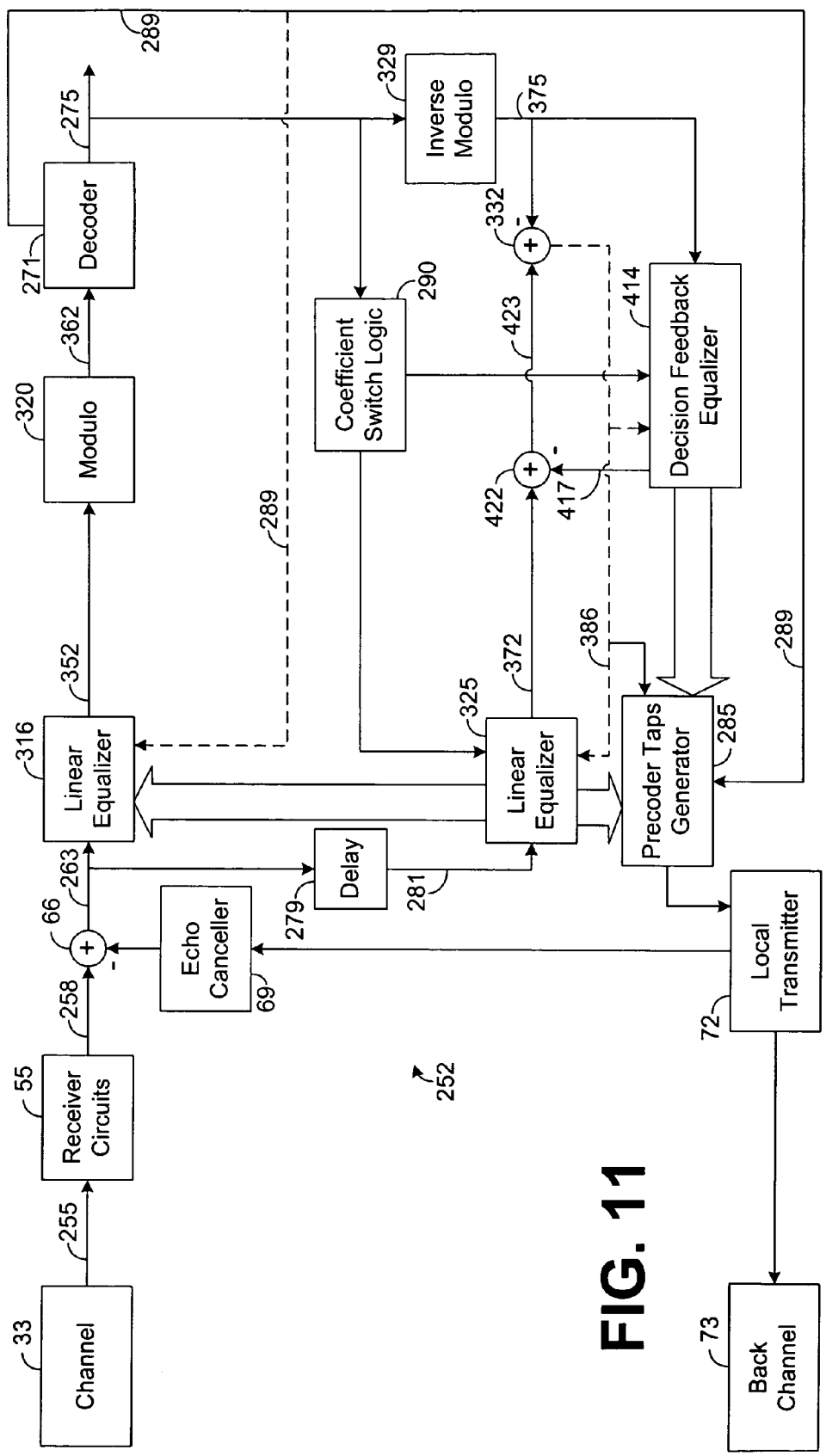
FIG. 11 is a block diagram illustrating a receiver configured to operate in a data mode of operation in accordance with yet another embodiment of present disclosure.

It should be apparent to one ordinarily skilled in the art that various modifications may be made to the configuration depicted by FIG. 10 without departing from the principles of the present disclosure. For example, FIG. 11 depicts an exemplary configuration of the receiver 252 for another embodiment of the present disclosure. As can be seen by comparing FIGS. 10 and 11, the configuration depicted by FIG. 11 is similar to that depicted by FIG. 10. However, the noise predictor 319 of FIG. 10 does not appear in the configuration of FIG. 11, and the noise predictor 327 and summer 333 of FIG. 10 are replaced by a decision feedback equalizer 414, as compared to the configuration of FIG. 10.

In the embodiment depicted by FIG. 11, the decision feedback equalizer 414 has a set of coefficients that are used to define or weight a signal 417 provided to a summer 422 such that the distortion of the signal 423 output by the summer 422 is reduced as compared to signal 372. Further, the decision feedback equalizer 414, via known or future-developed techniques, establishes and adaptively updates its coefficients based on feedback signal 375. In addition, the linear equalizer 325 may adaptively update its coefficients based on the combined signal 386 output from the summer 332. Moreover, when the precoder taps generator 285 decides to perform a precoder update, the precoder taps generator 285 may define a new set of precoder taps based on the coefficients of the linear equalizer 325 and the coefficients of the decision feedback equalizer 414. Further, when a precoder taps update occurs, the coefficients of linear equalizer 316 are preferably replaced with the coefficients of linear equalizer 325. Using the same synchronization techniques described above, the coefficient switch logic 290 ensures that the update of linear equalizer 316 is synchronized with the update of precoder 37.

The following steps may be used to initialize and update the coefficients for the precoder 37, linear equalizers 316 and 325, and decision feedback equalizer 414 of FIG. 11.

A. Initialization

Step I1: Set the coefficients of the linear equalizer 325 equal to the coefficients of the linear equalizer 316.

Step I2: Set the coefficients of the decision feedback equalizer 414 to zero.

B. Operation

Step 1: Calculate the mean squared value of error signal 365.

Step 2: Calculate the mean squared value of error signal 386.

Step 3: Compare the results of steps Step 1 and Step 2. If the result of Step 1 is substantially larger than the result of Step 2 then go to Step 5.

Step 4: Go to Step 1.

Step 5: Calculate the update coefficients for the precoder 37 as follows:
    Step 5.1: Convolve the coefficients of the precoder 37 with the coefficients of the decision feedback equalizer 414.
    Step 5.2: Add the result of Step 5.1 to the coefficients of the precoder 37.
    Step 5.3: Add the result of Step 5.2 to the coefficients of the decision feedback equalizer 414.

Step 6: Send the result of Step 5.3 to the transmitter 200.

Step 7: Wait until transmitter 200 receives the update precoder coefficients.

Step 8: Load the precoder 37 with the results of Step 5.3.

Step 10: Set the coefficients of decision feedback equalizer 414 equal to zero.

Step 11: Set the coefficients of the linear equalizer 316 equal to the coefficients of the linear equalizer 325.

Step 12: Go to Step 1.

Figure 12:
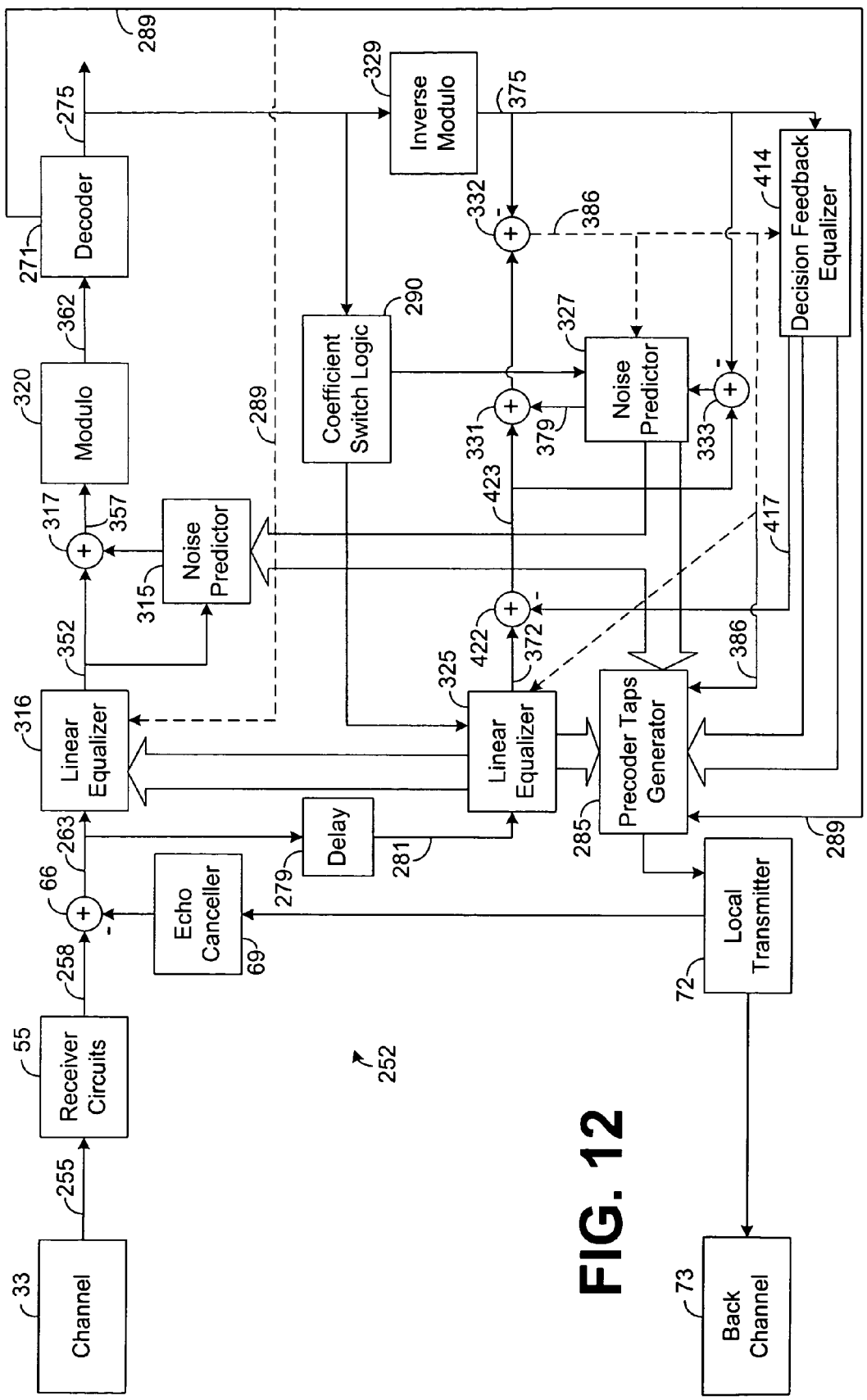
FIG. 12 is a block diagram illustrating a receiver configured to operate in a data mode of operation in accordance with yet another embodiment of present disclosure.

FIG. 12 depicts another exemplary configuration for the receiver 252. The configuration of FIG. 12 essentially represents a combination of the configurations depicted by FIGS. 10 and 11. In this regard, similar to FIG. 11, the observer path of FIG. 12 comprises a decision feedback equalizer 414 and a summer 422, which perform essentially the same functionality as described above for FIG. 11. Further, similar to FIG. 10, the observer path of FIG. 12 comprises a noise predictor 327 and summer 331, which perform essentially the same functionality as described above for FIG. 10. Note that the linear equalizer 325, the decision feedback equalizer 414, and the noise predictor 327 of FIG. 12 may respectively update their coefficients based on the signal 386 output from the summer 332. Further, when a precoder taps update occurs, the coefficients of linear equalizer 316 and noise predictor 315 are preferably replaced with the coefficients of linear equalizer 325 and noise predictor 327, respectively. Using the same synchronization techniques described above, the coefficient switch logic 290 ensures that the updates of linear equalizer 316 and noise predictor 315 are synchronized with the update of precoder 37.

The following steps may be used to initialize and update the coefficients for the precoder 37, linear equalizers 316 and 325, noise predictors 319 and 327, and decision feedback equalizer 414 of FIG. 12.

A. Initialization

Step I1: Set the coefficients of the linear equalizer 325 equal to the coefficients of the linear equalizer 316.

Step I2: Set the coefficients of the noise predictor 319, the coefficients of the noise predictor 327, and the coefficients of the decision feedback equalizer 414 to zero.

B. Operation

Step 1: Calculate the mean squared value of error signal 365.

Step 2: Calculate the mean squared value of error signal 386.

Step 3: Compare the results of steps Step 1 and Step 2. If the result of Step 1 is substantially larger than the result of Step 2 then go to Step 5.

Step 4: Go to Step 1.

Step 5: Calculate the update coefficients for the precoder 37 as follows:
- Step 5.1: Convolve the decision feedback equalizer 414 with the coefficients of the noise predictor 327.
- Step 5.2: Add the result of Step 5.1 to the coefficients of the decision feedback equalizer 414.
- Step 5.3: Add the result of Step 5.2 to the coefficients of the noise predictor 327.
- Step 5.4: Convolve the coefficients of the precoder 37 with the result of Step 5.3.
- Step 5.5: Add the result of Step 5.4 to the coefficients of the precoder 37.

Step 6: Send the result of Step 5.5 to the transmitter 200.

Step 7: Wait until transmitter 200 receives the update precoder coefficients.

Step 8: Load the precoder 37 with the results of Step 5.5.

Step 10: Set the coefficients of the noise predictor 319 equal to the coefficients of the noise predictor 327.

Step 11: Set the coefficients of the linear equalizer 316 equal to the coefficients of the linear equalizer 325.

Step 12: Convolve the coefficients of the linear equalizer 325 with the coefficients of the noise predictor 327.

Step 13: Load the result of Step 12 into the coefficients of the linear equalizer 325.

Step 14: Set the coefficients of the noise predictor 327 to zero.

Step 15: Set the coefficients of the decision feedback equalizer 414 to zero.

Step 16: Go to Step 1.

Note that the configuration shown by FIG. 12 is generally more complex than the configurations shown by FIGS. 10 and 11 but is likely to provide better performance. Further, the configuration shown by FIG. 10 is generally less complex than the configurations shown by FIGS. 11 and 12 but is not likely to provide as good or better performance as compared to the configurations shown by FIGS. 11 and 12. In addition, the configuration shown by FIG. 11 is generally between the configurations shown by FIGS. 10 and 12 in terms of complexity and performance.

The invention claimed is:

1. A system for enabling adaptive precoder updates, comprising:
    a first signal path configured to receive encoded signals, the first signal path having a decoder configured to decode the encoded signals thereby recovering data originally transmitted from a remote transmitter;
    a delay mechanism configured to receive and delay the encoded signals;
    a second signal path connected in parallel with the first signal path and configured to receive the encoded signals delayed by the delay mechanism, the second signal path having an adaptive filter configured to filter the encoded signals received by the second signal path based on a set of coefficients of the adaptive filter, the adaptive filter configured to adaptively update the coefficients based on the data recovered by the first signal path; and
    logic configured to adaptively generate new precoder taps based on the coefficients and to transmit the new precoder taps to a precoder,
    wherein the first and second signal paths are configured such that the signals filtered by the adaptive filter are not combined with signals to be decoded by the decoder.

2. The system of claim 1, wherein the encoded signals are Trellis encoded.

3. The system of claim 1, further comprising logic configured to adaptively update the precoder with the new precoder taps.

4. The system of claim 1, wherein the adaptive filter comprises a non-linear equalizer.

5. The system of claim 1, wherein the adaptive filter comprises a noise predictor.

6. The system of claim 1, wherein the adaptive filter comprises a decision feedback equalizer.

7. The system of claim 1, wherein a delay introduced by the delay mechanism to the encoded signals received by the delay mechanism substantially matches a delay associated with the decoder in decoding the encoded signals received by the first signal path.

8. The system of claim 1, further comprising logic configured to perform a comparison between an error detected by the first signal path and an error detected by the second signal path and to initiate, in response to the comparison, an update of the precoder based on the new precoder taps.

9. The system of claim 1, wherein the first signal path has an adaptive filter configured to filter the encoded signals received by the first signal path.

10. A system for enabling adaptive precoder updates, comprising:
    a first signal path configured to receive encoded signals, the first signal path having a decoder configured to decode the encoded signals thereby recovering data originally transmitted from a remote transmitter, the first signal path having an adaptive filter configured to filter the encoded signals received by the first signal path;
    a delay mechanism configured to receive and delay the encoded signals;
    a second signal path connected in parallel with the first signal path and configured to receive the encoded signals delayed by the delay mechanism, the second signal path having an adaptive filter configured to filter the encoded signals received by the second signal path based on a set of coefficients of the adaptive filter of the second signal path, the adaptive filter of the second signal path configured to adaptively update the coefficients based on the data recovered by the first signal path; and
    logic configured to adaptively generate new precoder taps based on the coefficients and to transmit the new precoder taps to a precoder,
    wherein the coefficients of the adaptive filter of the second signal path are initialized based on coefficients of the adaptive filter of the first signal path.

11. A system for enabling adaptive precoder updates, comprising:
    a first signal path configured to receive encoded signals, the first signal path having a decoder configured to decode the encoded signals thereby recovering data originally transmitted from a remote transmitter, the first signal path having an adaptive filter configured to filter the encoded signals received by the first signal path;
    a delay mechanism configured to receive and delay the encoded signals;
    a second signal path connected in parallel with the first signal path and configured to receive the encoded signals delayed by the delay mechanism, the second signal path having an adaptive filter configured to filter the encoded signals received by the second signal path based on a set of coefficients of the adaptive filter of the second signal path, the adaptive filter of the second signal path configured to adaptively update the coefficients based on the data recovered by the first signal path;

logic configured to adaptively generate new precoder taps based on the coefficients and to transmit the new precoder taps to a precoder;

logic configured to perform an adaptive update of the precoder based on the new precoder taps; and logic configured to perform an adaptive update of the adaptive filter of the first signal path based on the coefficients of the adaptive filter of the second signal path.

12. The system of claim 11, further comprising logic configured to synchronize the adaptive update of the adaptive filter of the first signal path with the adaptive update of the precoder.

13. The system of claim 12, wherein the logic configured to synchronize is configured to receive a message indicating when the adaptive filter of the first signal path is to receive encoded signals that have been precoded based on the new precoder taps and to initiate the adaptive update of the adaptive filter of the first signal path based on the message.

14. The system of claim 13, wherein the message identifies a number of frame synchs between the message and one of the encoded signals precoded based on the new precoder taps.

15. A system for enabling adaptive precoder updates, comprising:

a first signal path configured to receive an encoded signal, the first signal path having a decoder configured to decode the encoded signal thereby recovering a data symbol originally transmitted from a remote transmitter;

a second signal path configured to receive the encoded signal, the second signal path having an adaptive filter configured to filter the encoded signal received by the second signal path based on a set of coefficients of the adaptive filter after the decoder has decoded the encoded signal received by the first signal path, the adaptive filter further configured to adaptively update the coefficients based on the data symbol recovered by the decoder; and logic configured to adaptively generate new precoder taps based on the coefficients and to transmit the new precoder taps to a precoder, wherein the first and second signal paths are configured such that the encoded signal filtered by the adaptive filter is not combined with any signal propagating along the first signal path to be decoded by the decoder.

16. The system of claim 15, further comprising a delay mechanism configured to delay the encoded signal received by the second signal path such that the filter receives, at approximately the same time, the data symbol and the encoded signal received by the second signal path.

17. The system of claim 15, wherein the adaptive filter receives the encoded signal and the data symbol at approximately the same time.

18. The system of claim 15, wherein the first signal path has an adaptive filter configured to filter the encoded signal received by the first signal path, and wherein the coefficients of the adaptive filter of the second signal path are initialized based on coefficients of the adaptive filter of the first signal path.

19. The system of claim 15, wherein the first signal path has an adaptive filter configured to filter the encoded signal received by the first signal path, the system further comprising:

logic configured to perform an adaptive update of the precoder based on the new precoder taps; and logic configured to perform an adaptive update of the adaptive filter of the first signal path based on the coefficients of the adaptive filter of the second signal path.

20. The system of claim 19, further comprising logic configured to synchronize the adaptive update of the adaptive filter of the first signal path with the adaptive update of the precoder.

21. A system for enabling adaptive precoder updates, comprising:

first signal path means for receiving encoded signals, the first signal path means having a decoding means for decoding the encoded signals thereby recovering data originally transmitted from a remote transmitter;

means for delaying the encoded signals;

second signal path means in parallel with the first signal path means, the second signal path means for receiving the encoded signals delayed by the delaying means, the second signal path means having a means for adaptively filtering the encoded signals delayed by the delay means based on a set of coefficients of the filtering means without combining the filtered signals with signals to be decoded by the decoding means, wherein the coefficients are adaptively updated based on the data recovered by the decoding means; and means for adaptively generating new precoder taps based on the coefficients and for transmitting the new precoder taps to a precoder.

22. The system of claim 21, further comprising a means for adaptively updating the precoder with the new precoder taps.

23. The system of claim 21, wherein the decoding means comprises a Trellis decoder.

24. A method for enabling adaptive precoder updates, comprising the steps of:

providing a receiver having a first signal path and a second signal path that is in parallel with the first signal path, the first signal path having a decoder and the second signal path having an adaptive filter;

receiving an encoded signal at the receiver;

decoding the encoded signal via the decoder thereby recovering data originally transmitted from a remote transmitter;

filtering, after the decoding step, the encoded signal via the adaptive filter, wherein the filtering step is performed without transmitting the filtered signal to the first signal path to be combined with a signal that is to be decoded by the decoder;

adaptively updating coefficients of the adaptive filter based on the data recovered by the decoding step;

generating new precoder taps based on the coefficients; and transmitting the new precoder taps to a precoder.

25. The method of claim 24, further comprising the step of delaying the encoded signal such that the adaptive filter receives the encoded signal and the data at approximately the same time.

26. The method of claim 24, further comprising the step of adaptively updating the precoder based on the new precoder taps.

27. The method of claim 24, wherein the adaptive filter comprises a non-linear equalizer.

28. The method of claim 24, wherein the adaptive filter comprises a noise predictor.

29. The method of claim 24, wherein the adaptive filter comprises a decision feedback equalizer.

30. The method of claim 24, wherein the first signal path has an adaptive filter, the method further comprising the steps of:

filtering the encoded signal via the adaptive filter of the first signal path; and initializing the coefficients of the adaptive filter of the second signal path based on coefficients of the adaptive filter of the first signal path.

31. The method of claim 24, wherein the first signal path has an adaptive filter, the method further comprising the steps of:

adaptively updating the precoder based on the new precoder taps; and adaptively updating the adaptive filter of the first signal path based on the coefficients of the adaptive filter of the second signal path.

32. The method of claim 31, further comprising the step of synchronizing the adaptively updating steps.

33. The method of claim 32, wherein the synchronizing step is based on a message transmitted to the receiver, the message indicating when the adaptive filter of the first signal path is to begin receiving encoded signals that have been precoded by the precoder based on the new precoder taps.

34. The method of claim 33, wherein the message identifies a number of frame synchs between the message and one of the encoded signals precoded by the precoder based on the new precoder taps.

35. A method for enabling adaptive precoder updates, comprising the steps of:

providing a receiver having a first signal path and a second signal path that is in parallel with the first signal path, the first signal path having a decoder and the second signal path having an adaptive filter;

receiving an encoded signal at the receiver;

transmitting the encoded signal to the first signal path and to the second signal path;

decoding, via the decoder, the encoded signal transmitted to the first signal path thereby recovering data originally transmitted from a remote transmitter;

delaying the encoded signal transmitted to the second signal path;

filtering, via the adaptive filter, the delayed signal based on the data recovered by the decoder, wherein the filtering step is performed without transmitting the filtered signal to the first signal path to be combined with a signal that is to be decoded by the decoder;

adaptively generating new precoder taps based on coefficients of the adaptive filter; and transmitting the new precoder taps to a precoder.

36. The method of claim 35, further comprising the step of adaptively updating the precoder based on the new precoder taps.

37. The method of claim 35, wherein the delaying step causes the filter to receive the delayed signal and the data at approximately the same time.

38. The system of claim 1, wherein the adaptive filter has a linear equalizer configured to receive and filter the encoded signals received by the second signal path.

39. The system of claim 38, wherein the first signal path has a linear equalizer configured to filter the encoded signals received by the first signal path.

40. The system of claim 1, wherein each of the encoded signals delayed by the delay mechanism, when filtered by the adaptive filter, defines a respective data symbol from the remote transmitter.

41. The system of claim 15, wherein the encoded signal filtered by the adaptive filter defines the data symbol at the time of filtering by the adaptive filter.

42. The system of claim 21, wherein each of the encoded signals delayed by the delaying means, when filtered by the filtering means, defines a respective data symbol from the remote transmitter.

43. The method of claim 24, wherein the encoded signal, when filtered by the filtering step, defines a data symbol from the remote transmitter.

44. The method of claim 35, wherein the delayed signal, at the time of the filtering step, defines a data symbol from the remote transmitter.

45. A method for enabling adaptive precoder updates, comprising the steps of:

providing a receiver having a first signal path and a second signal path that is in parallel with the first signal path, the first signal path having a decoder and an adaptive filter, the second signal path having an adaptive filter;

receiving an encoded signal at the receiver;

decoding the encoded signal via the decoder thereby recovering data originally transmitted from a remote transmitter;

filtering, after the decoding step, the encoded signal via the adaptive filter of the second signal path;

initializing coefficients of the adaptive filter of the second signal path based on coefficients of the adaptive filter of the first signal path;

adaptively updating the coefficients of the adaptive filter of the second signal path based on the data recovered by the decoding step;

generating new precoder taps based on the coefficients; and transmitting the new precoder taps to a precoder.

46. A method for enabling adaptive precoder updates, comprising the steps of:

providing a receiver having a first signal path and a second signal path that is in parallel with the first signal path, the first signal path having a decoder and an adaptive filter, the second signal path having an adaptive filter;

receiving an encoded signal at the receiver;

decoding the encoded signal via the decoder thereby recovering data originally transmitted from a remote transmitter;

filtering, after the decoding step, the encoded signal via the adaptive filter of the second signal path;

adaptively updating coefficients of the adaptive filter of the second signal path based on the data recovered by the decoding step;

generating new precoder taps based on the coefficients;

transmitting the new precoder taps to a precoder;

adaptively updating the precoder based on the new precoder taps; and adaptively updating the adaptive filter of the first signal path based on the coefficients of the adaptive filter of the second signal path.

* * * * *